US009639521B2

(12) United States Patent
Seow et al.

(10) Patent No.: US 9,639,521 B2
(45) Date of Patent: May 2, 2017

(54) COGNITIVE NEURO-LINGUISTIC BEHAVIOR RECOGNITION SYSTEM FOR MULTI-SENSOR DATA FUSION

(71) Applicant: Omni AI, Inc., Dallas, TX (US)

(72) Inventors: Ming-Jung Seow, Richmond, TX (US); Wesley Kenneth Cobb, The Woodlands, TX (US); Gang Xu, Houston, TX (US); Tao Yang, Katy, TX (US); Aaron Poffenberger, Houston, TX (US); Lon W. Risinger, Katy, TX (US); Kishor Adinath Saitwal, Pearland, TX (US); Michael S. Yantosca, Katy, TX (US); David M. Solum, Houston, TX (US); Alex David Hemsath, Houston, TX (US); Dennis G. Urech, Katy, TX (US); Duy Trong Nguyen, Friendswood, TX (US); Charles Richard Morgan, Katy, TX (US)

(73) Assignee: Omni AI, Inc., Dallas, TX (US)

( * ) Notice: Subject to any disclaimer, the term of this patent is extended or adjusted under 35 U.S.C. 154(b) by 0 days.

(21) Appl. No.: 14/457,082

(22) Filed: Aug. 11, 2014

(65) Prior Publication Data

US 2015/0046155 A1    Feb. 12, 2015

Related U.S. Application Data

(60) Provisional application No. 61/864,274, filed on Aug. 9, 2013.

(51) Int. Cl.
*G06F 17/27* (2006.01)
*H04L 29/06* (2006.01)
*G06N 99/00* (2010.01)

(52) U.S. Cl.
CPC ...... *G06F 17/2735* (2013.01); *G06F 17/2785* (2013.01); *G06N 99/005* (2013.01);
(Continued)

(58) Field of Classification Search
CPC ............. G06F 17/2785; G06F 17/2735; G06F 17/2795; G06F 17/274; G06F 17/271;
(Continued)

(56) References Cited

U.S. PATENT DOCUMENTS 4,679,077 A    7/1987    Yuasa et al.
5,113,507 A    5/1992    Jaeckel
(Continued)

FOREIGN PATENT DOCUMENTS

CN        102571486 A        7/2012
WO        2009049314 A2      4/2009

OTHER PUBLICATIONS

J. Connell et al., "Detection and Tracking in the IBM PeopleVision System," IEEE ICME, Jun. 2004: pp. 1-4, <http://www.research.ibm.com/peoplevision>.
(Continued)

*Primary Examiner* — Vu B Hang
(74) *Attorney, Agent, or Firm* — NW Poulsen

(57) ABSTRACT

Embodiments presented herein describe techniques for generating a linguistic model of input data obtained from a data source (e.g., a video camera). According to one embodiment of the present disclosure, a sequence of symbols is generated based on an ordered stream of normalized vectors generated from the input data. A dictionary of words is generated from combinations of the ordered sequence of symbols based on a frequency at which combinations of symbols appear in the ordered sequence of symbols. A plurality of phrases is generated based an ordered sequence of words from the dictionary observed in the ordered sequence of symbols
(Continued)

based on a frequency by which combinations of words in ordered sequence of words appear relative to one another.

21 Claims, 7 Drawing Sheets

(52) U.S. Cl.
CPC ........ *H04L 63/1408* (2013.01); *G06F 17/274* (2013.01); *G06F 17/277* (2013.01); *G06F 17/2775* (2013.01); *G06F 17/2795* (2013.01)

(58) Field of Classification Search
CPC ............... G06F 17/277; G06F 17/2755; G06F 17/2872; G06F 17/2827; G06F 17/289
USPC .................................................. 704/10, 4, 9
See application file for complete search history.

(56) References Cited

U.S. PATENT DOCUMENTS

| | | | |
|---|---|---|---|
| 5,748,775 A | 5/1998 | Tsuchikawa et al. | |
| 5,751,378 A | 5/1998 | Chen et al. | |
| 5,969,755 A | 10/1999 | Courtney | |
| 6,252,974 B1 | 6/2001 | Martens et al. | |
| 6,263,088 B1 | 7/2001 | Crabtree et al. | |
| 6,570,608 B1 | 5/2003 | Tserng | |
| 6,661,918 B1 | 12/2003 | Gordon et al. | |
| 6,674,877 B1 | 1/2004 | Jojic et al. | |
| 6,678,413 B1 | 1/2004 | Liang et al. | |
| 6,856,249 B2 | 2/2005 | Strubbe et al. | |
| 6,940,998 B2 | 9/2005 | Garoutte | |
| 7,076,102 B2 | 7/2006 | Lin et al. | |
| 7,136,525 B1 | 11/2006 | Toyama et al. | |
| 7,158,680 B2 | 1/2007 | Pace | |
| 7,200,266 B2 | 4/2007 | Ozer et al. | |
| 7,227,893 B1 | 6/2007 | Srinivasa et al. | |
| 7,436,887 B2 | 10/2008 | Yeredor et al. | |
| 7,825,954 B2 | 11/2010 | Zhang et al. | |
| 7,868,912 B2 | 1/2011 | Venetianer et al. | |
| 8,176,048 B2 | 5/2012 | Morgan | |
| 2003/0107650 A1 | 6/2003 | Colmenarez et al. | |
| 2003/0228058 A1 | 12/2003 | Xie et al. | |
| 2004/0151342 A1 | 8/2004 | Venetianer et al. | |
| 2005/0001759 A1 | 1/2005 | Khosla | |
| 2005/0105765 A1 | 5/2005 | Han et al. | |
| 2005/0240629 A1 | 10/2005 | Gu et al. | |
| 2006/0018516 A1 | 1/2006 | Masoud et al. | |
| 2006/0138338 A1 | 6/2006 | Tezuka et al. | |
| 2006/0156404 A1 | 7/2006 | Day | |
| 2006/0165386 A1 | 7/2006 | Garoutte | |
| 2006/0190419 A1 | 8/2006 | Bunn et al. | |
| 2006/0193516 A1 | 8/2006 | Toyama et al. | |
| 2006/0222206 A1 | 10/2006 | Garoutte | |
| 2007/0136256 A1* | 6/2007 | Kapur ................. G06F 17/3069 | |
| 2007/0250898 A1 | 10/2007 | Scanlon et al. | |
| 2007/0263900 A1 | 11/2007 | Medasani et al. | |
| 2008/0002856 A1 | 1/2008 | Ma et al. | |
| 2008/0120720 A1 | 5/2008 | Guo et al. | |
| 2008/0181453 A1 | 7/2008 | Xu et al. | |
| 2008/0181499 A1 | 7/2008 | Yang et al. | |
| 2008/0193010 A1 | 8/2008 | Eaton et al. | |
| 2008/0240496 A1 | 10/2008 | Senior | |
| 2008/0247599 A1 | 10/2008 | Porikli et al. | |
| 2008/0252723 A1 | 10/2008 | Park | |
| 2009/0016599 A1 | 1/2009 | Eaton et al. | |
| 2009/0016600 A1 | 1/2009 | Eaton et al. | |
| 2009/0022364 A1 | 1/2009 | Swaminathan et al. | |
| 2009/0067716 A1 | 3/2009 | Brown et al. | |
| 2009/0165137 A1 | 6/2009 | Yoo et al. | |
| 2009/0210367 A1 | 8/2009 | Armstrong et al. | |
| 2009/0297023 A1 | 12/2009 | Lipton et al. | |
| 2009/0324107 A1 | 12/2009 | Walch | |
| 2010/0063949 A1 | 3/2010 | Eaton et al. | |
| 2010/0150471 A1 | 6/2010 | Cobb et al. | |
| 2010/0322516 A1 | 12/2010 | Xu et al. | |
| 2011/0064267 A1* | 3/2011 | Cobb .................. G06K 9/00771 382/103 |
| 2011/0305399 A1* | 12/2011 | Zitnick ............. G06F 17/30256 382/225 |
| 2012/0131674 A1 | 5/2012 | Wittenschlaeger | |
| 2012/0310944 A1 | 12/2012 | Mizuguchi et al. | |

OTHER PUBLICATIONS

Helmut Grabner et al., "On-line Boosting and Vision," IEEE Conference on Computer Vision and Pattern Recognition (CVPR), 2006, vol. 1: pp. 260-267.

Ismail Haritaoglu et al., "Ghost: A Human Body Part Labeling System Using Silhouettes," 14th Annual International Conference on Pattern Recognition, Aug. 1998: pp. 77-82.

Richard Nock et al., "Statistical Region Merging," IEEE Transactions on Pattern Analysis and Machine Intelligence, Nov. 2004, vol. 26(11): pp. 1452-1458.

Apewokin et al. "Multimodal Mean Adaptive Backgrounding for Embedded Real-Time Video Surveillance," Jun. 2007, IEEE 6 pages. Minneapolis, MN US.

Elgammal et al. "Non-parametric Model for Background Substraction," Computer Vision Laboratory, University of Maryland; Jun. 2000; 17 pages, College Park, MD US.

Haritaogul et al. "W4: Real-Time Surveillance of People and Their Activities," IEEE Transactions on Pattern Analysis and Machine Intelligence, Aug. 2000; vol. 22, No. 8; pp. 809-830.

Ivanov et al. "Video Surveillance of Interactions," MIT Media Laboratory, Cambridge, MA, Jul. 1999; 8 pages, Fort Collins, CO US.

Chris Stauffer et al., "Adaptive background mixture models for real-time tracking," Proceedings IEEE Conference on Computer Vision and Pattern Recognition, 1999: pp. 246-252.

Pentti Kanerva "Sparse Distributed memory and Related Models," M.H. Hassoun, ed., Associative Neural Memories: Theory and Implementation, 1993, pp. 50-76. New York: Oxford University Press.

Senior et al. "Appearance Models for Occlusion Handling," IBM T.J. Watson Research Center, 2001, 8 pages, Yorktown, Heights, NY US.

Chris Stauffer et al., "Learning Patterns of Activity Using Real-Time Tracking," IEEE Transactions on Pattern Analysis and Machine Intelligence (TPAMI), Aug. 2000, vol. 22(8): 747-757.

Ramadge, Peter J.G. et al., "The Control of Discrete Event Systems", proceeding of the IEEE, vol. 77, No. 1, pp. 81-98, Jan. 1989.

Bobbio, Andrea et al., "Analysis of Large Scale Interacting Systems by Mean Field Method", In: Fifth International Conference on Quantitative Evaluation of Systems 2008, pp. 215-224, Sep. 14-17, 2008.

Werner-Stark, Agnes et al., "Discrete Event Model Structure Identification Using Process Mining", In: Proceedings of the IASTED International Confeence Modelling, Identification, and Control (MIC 2011), pp. 228-233, Feb. 14-16, 2011.

Fernandez, C. et al., "Determining the Best Suited Semantic Events for Cognitive Surveillance", Expert Systems with Applications 2011, vol. 38, No. 4, pp. 4068-4079, Apr. 2011.

International Search Report for PCT Application No. PCT/US2014/050606, dated Dec. 26, 2014.

Hubballi, N. et al., "Layered Higher Order N-Grams for Hardening Payload Based Anomaly Itrusion Detection," IEEE, Feb. 2010.

Konrad Rieck et al., "Language models for detection of unknown attacks in network traffic," Journal in Computer Virology, Springer-Verlag, PA, vol. 2, No. 4, Dec. 19, 2006.

European Search Report dated Aug. 8, 2016 (PCT/US2014050606).

\* cited by examiner

COGNITIVE NEURO-LINGUISTIC BEHAVIOR RECOGNITION SYSTEM FOR MULTI-SENSOR DATA FUSION

CROSS-REFERENCE TO RELATED APPLICATION

This application claims benefit of U.S. Provisional Patent Application Ser. No. 61/864,274, filed Aug. 9, 2013, which is incorporated herein by reference in its entirety.

BACKGROUND

Field

Embodiments described herein generally relate to surveillance, more particularly, to analyzing and learning behavior based on a variety of input data.

Description of the Related Art

Many currently available surveillance and monitoring systems (e.g., video surveillance systems, SCADA systems, and the like) are trained to observe specific activities and alert an administrator after detecting those activities. However, such systems require advance knowledge of what actions and/or objects to observe. The activities may be hard-coded into underlying applications or the system may train itself based on provided definitions. In other words, unless the underlying code includes descriptions of certain behaviors, the system is incapable of recognizing such behaviors.

In addition, many surveillance systems, e.g., video surveillance systems, require a significant amount of computing resources, including processor power, storage, and bandwidth. For example, typical video surveillance systems require a large amount of computing resources per camera feed because of the typical size of video data. Given the cost of the resources, such systems are difficult to scale.

SUMMARY

One embodiment presented herein includes a method for generating a linguistic model of input data obtained from a data source. The method generally includes generating a sequence of symbols based on an ordered stream of normalized vectors generated from the input data. A dictionary of words is generated from combinations of the ordered sequence of symbols based on a frequency at which combinations of symbols appear in the ordered sequence of symbols. A plurality of phrases is generated based an ordered sequence of words from the dictionary observed in the ordered sequence of symbols based on a frequency by which combinations of words in ordered sequence of words appear relative to one another.

Another embodiment includes a computer-readable storage medium having instructions, which, when executed on a processor, performs an operation for generating a linguistic model of input data obtained from a data source. The operation generally includes generating a sequence of symbols based on an ordered stream of normalized vectors generated from the input data. A dictionary of words is generated from combinations of the ordered sequence of symbols based on a frequency at which combinations of symbols appear in the ordered sequence of symbols. A plurality of phrases is generated based an ordered sequence of words from the dictionary observed in the ordered sequence of symbols based on a frequency by which combinations of words in ordered sequence of words appear relative to one another.

Still another embodiment includes a system having a processor and a memory storing a program, which, when executed on the processor, performs an operation for generating a linguistic model of input data obtained from a data source. The operation generally includes generating a sequence of symbols based on an ordered stream of normalized vectors generated from the input data. A dictionary of words is generated from combinations of the ordered sequence of symbols based on a frequency at which combinations of symbols appear in the ordered sequence of symbols. A plurality of phrases is generated based an ordered sequence of words from the dictionary observed in the ordered sequence of symbols based on a frequency by which combinations of words in ordered sequence of words appear relative to one another.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
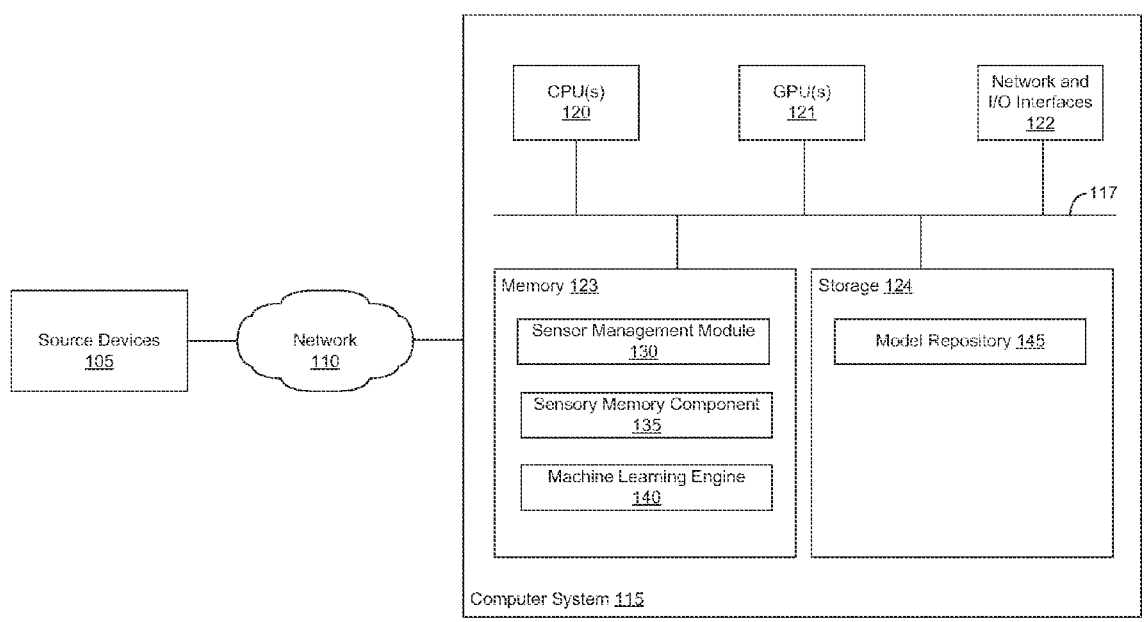
FIG. 1 illustrates an example computing environment for a behavioral recognition system, according to one embodiment.

Embodiments presented herein describe a behavior recognition system. The behavior recognition system may be configured with one or more data collector components that collect raw data values from different data sources (e.g., video data, building management data, SCADA data). For example, a behavior recognition system may be configured for video surveillance. The behavior recognition system may include a data collector component that retrieves video frames in real-time, separates foreground objects from background objects, and tracks foreground objects from frame-to-frame. The data collector component may normalize the video frame data into numerical values (e.g., falling within a range from 0 to 1 with respect to a given data type).

In one embodiment, the behavior recognition system includes a neuro-linguistic module that performs neural network-based linguistic analysis on the data collected. Specifically, for each type of data observed, the neuro-linguistic module creates and refines a linguistic model of the normalized data. The behavior recognition system uses the linguistic model to describe what is being observed.

To generate the linguistic model, the neuro-linguistic module receives normalized data values and organizes the data into clusters. Further, the neuro-linguistic module generates symbols, e.g., letters, corresponding to each cluster. Thus, input values associated with a given cluster are assigned a symbol.

The neuro-linguistic module generates a lexicon, i.e., builds a dictionary, of observed combinations of symbols, e.g., words, based on a statistical distribution of symbols identified in the input data. Specifically, the neuro-linguistic module may identify patterns of symbols in the input data at different frequencies of occurrence.

Using words from the dictionary, the neuro-linguistic module generates phrases based on probabilistic relationships of each word occurring in sequence relative to other words. For example, the neuro-linguistic module may identify a relationship between a given three-letter word that frequently appears in sequence with a given four-letter word, and so on.

The syntax allows the behavior recognition system to learn, identify, and recognize patterns of behavior without the aid or guidance of predefined activities. Unlike a rules-based surveillance system, which contains predefined patterns of what to identify or observe, the behavior recognition system learns patterns by generalizing input and building behavior memories of what is observed. Over time, the behavior recognition system uses these memories to distinguish between normal and anomalous behavior reflected in observed data.

For instance, the neuro-linguistic module builds letters, words (nouns, adjectives, verbs, etc.), phrases, and estimates an "unusualness score" for each identified letter, word, or phrase. The unusualness score (for a letter, word, or phrase observed in input data) indicates how infrequently the letter, word, or phrase has occurred relative to past observations. Thus, the behavior recognition system may use the unusualness scores to both identify and measure how unusual a current syntax is relative to a stable model of symbols (i.e., letters), a stable model of words built from the symbols (i.e., a dictionary) and a stable model of phrase built from the words (i.e., a syntax)—collectively the neuro-linguistic model.

In addition, as the neuro-linguistic module receives more input data, the neuro-linguistic module may decay, reinforce, and generate letters, words, and syntax phrases over time. In parlance with the machine learning field, the neuro-linguistic module "learns on-line" as new data is received and occurrences either increase, decrease, or appear.

FIG. 1 illustrates components of a behavioral recognition system 100, according to one embodiment. As shown, the behavioral recognition system 100 includes one or more input source devices 105, a network 110, and one or more computer systems 115. The network 110 may transmit data input by the source devices 105 to the computer system 115. Generally, the computing environment 100 may include one or more physical computer systems 115 connected via a network (e.g., the Internet). Alternatively, the computer systems 115 may be cloud computing resources connected by the network. Illustratively, the computer system 115 includes one or more central processing units (CPU) 120, one or more graphics processing units (GPU) 121, network and I/O interfaces 122, a storage 124 (e.g., a disk drive, optical disk drive, and the like), and a memory 123 that includes a sensor management module 130, a sensory memory component 135, and a machine learning engine 140. The storage 124 includes a model repository 145.

The CPU 120 retrieves and executes programming instructions stored in the memory 123 as well as stores and retrieves application data residing in the storage 124. In one embodiment, the GPU 121 implements a Compute Unified Device Architecture (CUDA). Further, the GPU 121 is configured to provide general purpose processing using the parallel throughput architecture of the GPU 121 to more efficiently retrieve and execute programming instructions stored in the memory 123 and also to store and retrieve application data residing in the storage 124. Taking advantage of the parallel computing elements of the GPU 121 allows the behavior recognition system 100 to better process large amounts of incoming data (e.g., input from a video and/or audio source). As a result, the behavior recognition system 100 may scale with relatively less difficulty.

The sensor management module 130 provides one or more data collector components. Each of the collector components is associated with a particular input data source, e.g., a video source, a SCADA (supervisory control and data acquisition) source, an audio source, etc. The collector components retrieve (or receive, depending on the sensor) input data from each source at specified intervals (e.g., once a minute, once every thirty minutes, once every thirty seconds, etc.). The sensor management module 130 controls the communications between the data sources. Further, the sensor management module 130 normalizes input data and sends the normalized data to the sensory memory component 135.

The sensory memory component 135 is a data store that transfers large volumes of data from the sensor management module 130 to the machine learning engine 140. The sensory memory component 135 stores the data as records. Each record may include an identifier, a timestamp, and a data payload. Further, the sensory memory component 135 aggregates incoming data in a time-sorted fashion. Storing incoming data from each of the data collector components in a single location where the data may be aggregated allows the machine learning engine 140 to process the data efficiently. Further, the behavior recognition system 115 may reference data stored in the sensory memory component 135 in generating alerts for anomalous activity. In one embodiment, the sensory memory component 135 may be implemented in via a virtual memory file system in the memory 123. In another embodiment, the sensory memory component 135 is implemented using a key-value share.

The machine learning engine 140 receives data output from the sensor management module 135. Generally, components of the machine learning engine 140 generate a linguistic representation of the normalized vectors. As described further below, to do so, the machine learning engine 140 clusters normalized values having similar features and assigns a distinct symbol to each cluster, The machine learning engine 140 may then identify recurring combinations of symbols (i.e., words) in the data. The machine learning engine 140 then similarly identifies recurring combinations of words (i.e., phrases) in the data.

Note, however, FIG. 1 illustrates merely one possible arrangement of the behavior recognition system 100. For example, although the input data sources 105 are shown connected to the computer system 115 via network 110, the network 110 is not always present or needed (e.g., an input source such as a video camera may be directly connected to the computer system 115).

Figure 2:
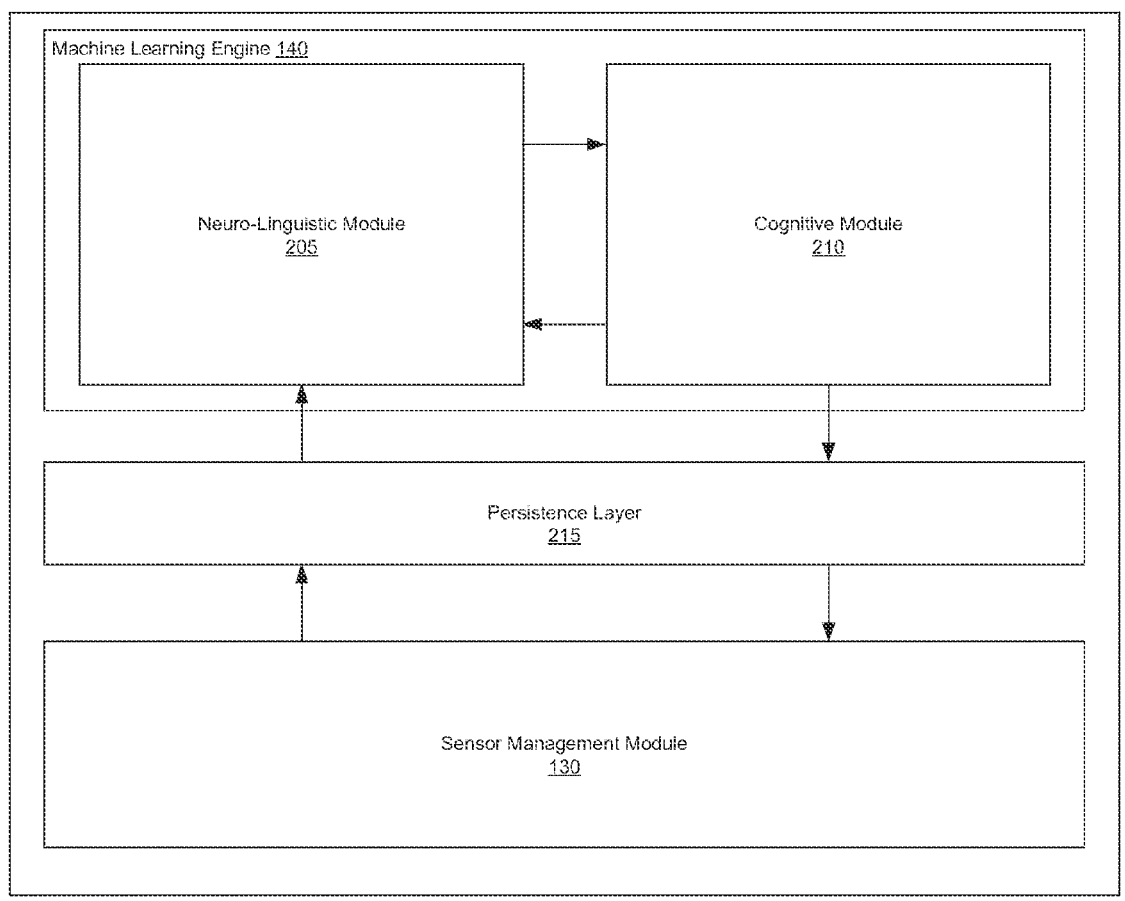
FIG. 2 illustrates a high-level layout of a behavioral recognition system, according to one embodiment.

FIG. 2 illustrates a system architecture of the behavior recognition system 100, according to one embodiment. As shown, the sensor management module 130 and the machine learning engine 140 communicate via a persistence layer 215.

The persistence layer 215 includes multiple data stores that maintain information used by different components of the behavior recognition system 100. For example, the persistence layer 215 includes data stores that maintain information describing properties of the various sensors associated with the behavior recognition system 100, system properties, and properties of the data collector components (further described below). Other data stores may maintain learning model information system events, and behavioral alerts. In addition, the sensory memory component 135 resides in the persistence layer 215.

The machine learning engine 140 itself includes a neuro-linguistic module 205 and a cognitive module 210. Generally, the neuro-linguistic module 205 performs neural network-based linguistic analysis of normalized input data to describe activity observed in the data. However, rather than describing the activity based on pre-defined objects and actions, the neuro-linguistic module 205 generates a custom language based on symbols, e.g., letters, identified in the input data. Once the set of symbols reaches a statistically mature state, the neuro-linguistic module 205 builds a dictionary by identifying combinations of letters, e.g., words, occurring in sequence in the input data. After the dictionary has matured, the neuro-linguistic module 205 identifies set of percepts, e.g., a syntax collection of phrases, based on relationships indicating probabilities of different words from the dictionary being observed in sequence with one another.

The cognitive module 210 evaluates the symbols, words, and phrases as input identified by the neuro-linguistic module 205. The cognitive module 210 identifies patterns of behavior described in the identified phrases. The cognitive module 210 evaluates activity occurring in the linguistic representation of the data and stores activity as memories. Over time, the symbols, words, and phrases generated from the observed data reach a mature state. Thereafter, upon observing subsequent events in the data streams, the cognitive module is able to detect anomalous activity and generate alerts.

Figure 3:
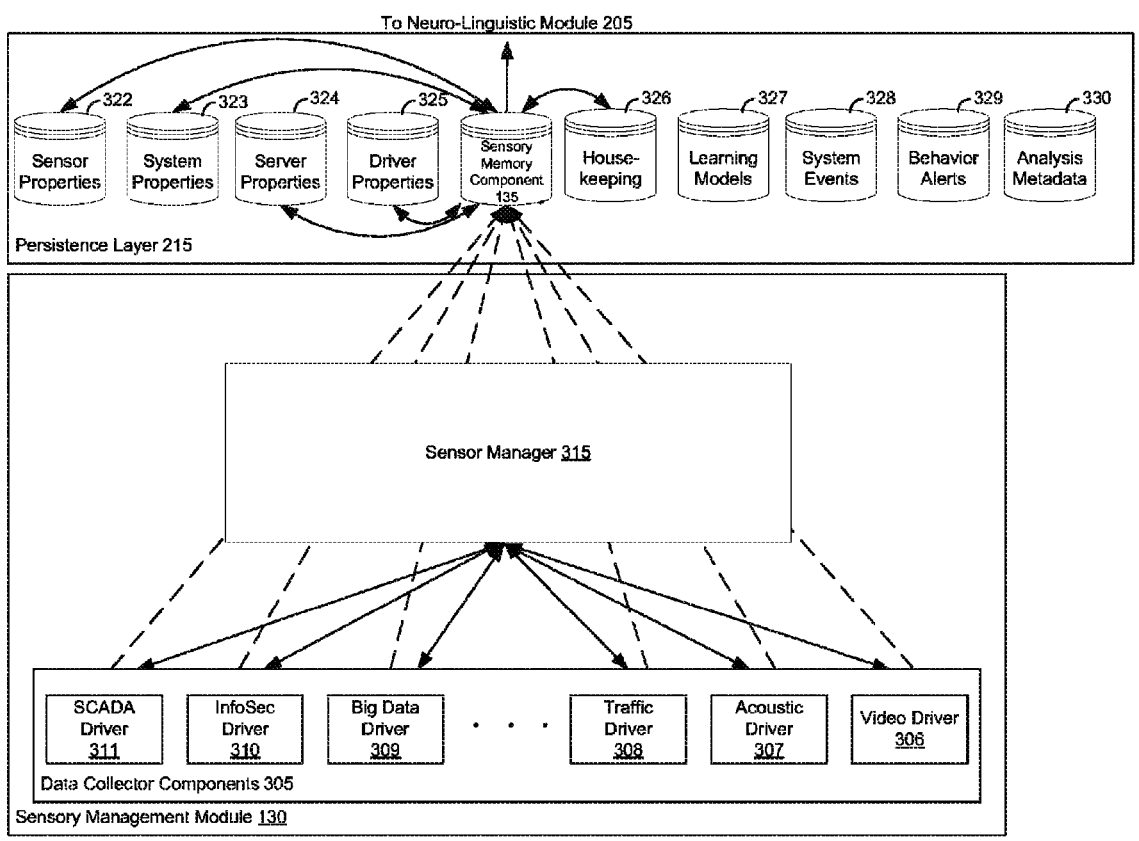
FIG. 3 illustrates a sensor management module of a behavioral recognition system, according to one embodiment.

FIG. 3 further illustrates the sensor management module 130 and the persistence layer 215 of the behavior recognition system 100, according to one embodiment. As shown, the sensor management module 130 further includes multiple data collector components 305 and a sensor manager 315. As stated, a data collector component (drivers) 305 evaluates data from an associated input data source.

As shown, the sensor management module 130 may include a variety of data collector components 305. One example is a video driver 306. The video driver 306 may retrieve input data from a video feed, i.e., frames of video, and evaluate the frames to separate foreground objects from background objects, track foreground objects, evaluate appearance and kinematic features, etc. The video driver 306 normalizes the extracted data and information into numerical values, e.g., within a range of 0 to 1, relative to the type of data. The video driver 306 sends a vector of the normalized data to the sensory memory component 135 at specified intervals.

Another example is a supervisory control and data acquisition (SCADA) driver 311. The SCADA driver 311 receives readings from SCADA sensors (e.g., temperature sensors, viscosity sensors, etc.). The SCADA driver 311 normalizes the obtained readings into numerical values, e.g., within a range of 0 to 1, relative to the type of sensor. The SCADA driver 311 sends a vector of the normalized sensor readings as a group to the sensory memory component 135.

Other examples may include an audio driver 307 for extracting audio feed data, a traffic driver 308 for receiving automobile traffic data (e.g., obtained at intersections, expressways, etc.), a big data driver 309 for receiving large amounts of complex data, and an information security driver 310 for receiving network and security related data. Of course, the sensor management module 130 may support other types of data collector components 305. In one embodiment, the sensor management module 130 provides an external application programming interface (API) and a software development kit (SDK) that allows users to develop data collector components 305.

The sensor manager 315 is a system service that loads, initializes, and controls the data collector component 305. For example, the sensor manager 315 may, through an API call, start or stop the operation of any given data collector component 305. For example, when a client application requests a video feed to be added to the machine learning engine 140, the sensor manager 315 identifies details for the feed that were stored at the time the data collector component 305 was registered. The sensor manager 315 then sends the details to the video driver 306. In turn, the video driver 306 starts the video feed and begins retrieving video input data.

In one embodiment, the data collector components 305 send normalized data to the sensory memory component 135. The data collector components 305 may send the data values along with other information associated with the value, such as a timestamp, a boxcar average, and historical high and low values. As stated, the sensory memory component 135 is a data store that transfers large volumes of data from the sensor management module 130 to the machine learning engine 140. The sensory memory component 135 maintains a historical buffer that stores numerous transactions per data collector component. Further, the sensory memory component 135 aggregates incoming sensory data in a time-sorted fashion. In one embodiment, the sensory memory component 135 transmits the aggregated data to the neuro-linguistic module 205.

The sensory memory component 135 is associated with data stores in the persistence layer 215 that maintain information about various aspects of the behavior recognition system 100. For example, the persistence layer 215 includes sensor properties 322, system properties 323, server properties 324, and driver properties 325. The sensor properties 322 provide information describing sensors associated with the data collector components 305, such as a maximum range for types of data, serial numbers of devices associated with the data collector components 305, name information, location information, assigned computing device, etc. The system properties 323 provide configuration information that governs the execution of processes running in the computing system 115, such as system configuration settings used during initial set-up of the computing system 115. The server properties 324 summarize information about the computing system 115 (e.g., UUID, machine ID, amount of storage, amount of memory, etc.). The driver properties 325 describe information about the data collector components 305, such as configuration and operation information.

Further, the persistence layer 215 may include additional data stores. For example, the persistence layer 215 may include a housekeeping store 326, learning models store 327, system events store 328, behavior alerts store 329, and analysis metadata store 330. The housekeeping store 326 maintains data about the system and sensors. The learning models store 327 maintains models that pertain to the learning memories generated by the cognitive module 210. The system events store 328 maintains event data that describes observations. The behavior alerts store 329 maintains event data that describes anomalous activity that accompany alerts sent to a user. For example, in a video surveillance context, the behavior alerts store 329 may include video clips of activity identified as anomalous by the cognitive module 210 as well as other metadata associated with the event, such as time, location, etc. The analysis metadata store 330 maintains information associated with data evaluated by each of the data collector components 305. The analysis metadata store 330 may include visualizations of the evaluated data. For example, in the video surveillance case, the analysis metadata store 330 may include images of video frames and contour maps corresponding to each image.

In one embodiment, each of the data stores maintained in the persistence layer 215 other than the sensory memory component 135 may be implemented as a database, e.g., a NoSQL database.

Figure 4:
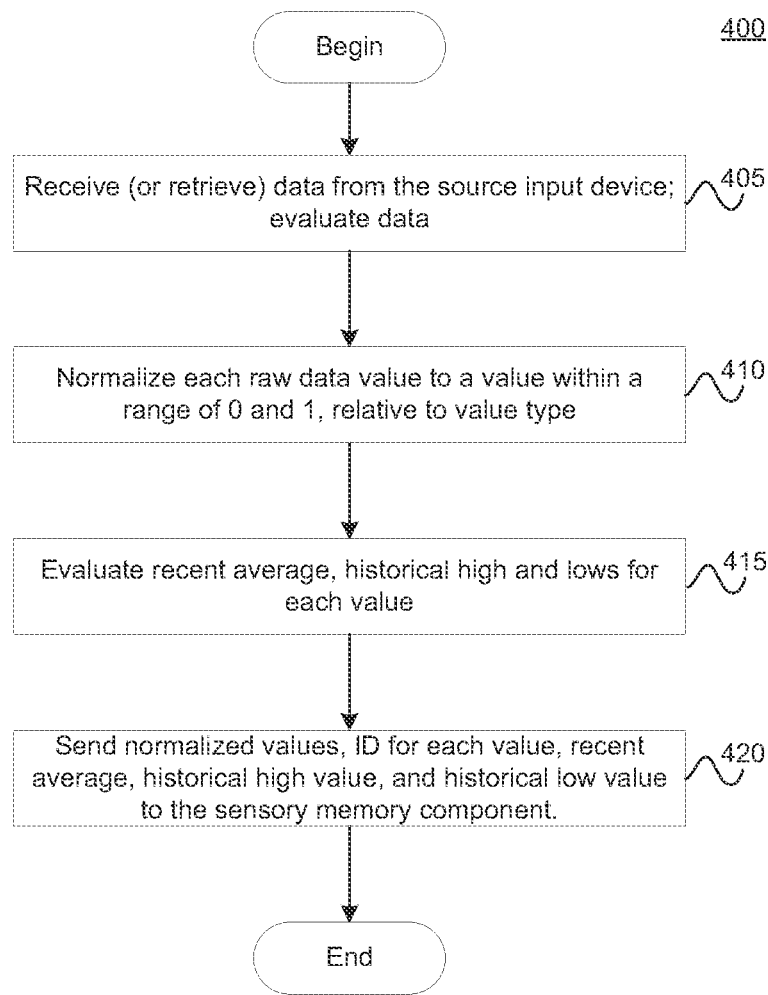
FIG. 4 illustrates a method for collecting sensor data for use in a behavioral recognition system, according to one embodiment.

FIG. 4 illustrates a method for collecting sensor data for use in a behavior recognition system, according to one embodiment. More specifically, method 400 describes how a data collector 305 collects data from an associated input device and sends the data to the neuro-linguistic module 205. To better describe the method 400, assume that the video driver 306 carries out the steps of the method. Of course, the method 400 may be applicable for other data collector components 305.

Method 400 begins at step 405, where the video driver 306 retrieves data from the source input device. In this case, the video driver 306 may retrieve video frames from a video source, such as a video camera positioned to observe a particular location, such as a hotel lobby. Further, the video driver 306 identifies data values to send to the sensory memory component 135. To do so, the video driver 306 may evaluate the video frames to separate foreground objects from background objects, measure appearance and kinematic information of the identified foreground objects, and track foreground objects moving across the scene (i.e., the field of view of the camera). As a result, the video driver 306 ascertains values to be sent to the sensory memory component 135, such as values for the appearance and kinematic information.

At step 410, the video driver 306 normalizes each data value to a numerical value falling within a range, e.g., between 0 to 1, relative to the type of that data value. For example, values associated with kinematic features are normalized from 0 to 1 relative to other values associated kinematic features. Doing so results in each value being converted to a common format that allows the neuro-linguistic module 205 to recognize recurring events in the video stream.

After normalizing the values, at step 415, the video driver 410 identifies additional data associated with the normalized values, such as a timestamp of a given value, an average associated with the data type of the value, and historical high and low values for that data type. Doing so allows the video driver 306 to readjust the normalization in the event that the video source is modified. Specifically, the video driver 306 references the identified historical values and averages to readjust the normalization.

At step 420, the video driver 306 sends a vector of the normalized values and associated data to the sensory memory component 135. As stated, the sensory memory component 135 stores the normalized values and associated data. The neuro-linguistic module 205 may then retrieve the normalized values from the sensory memory component 135 and perform linguistic analysis thereafter.

Figure 5:
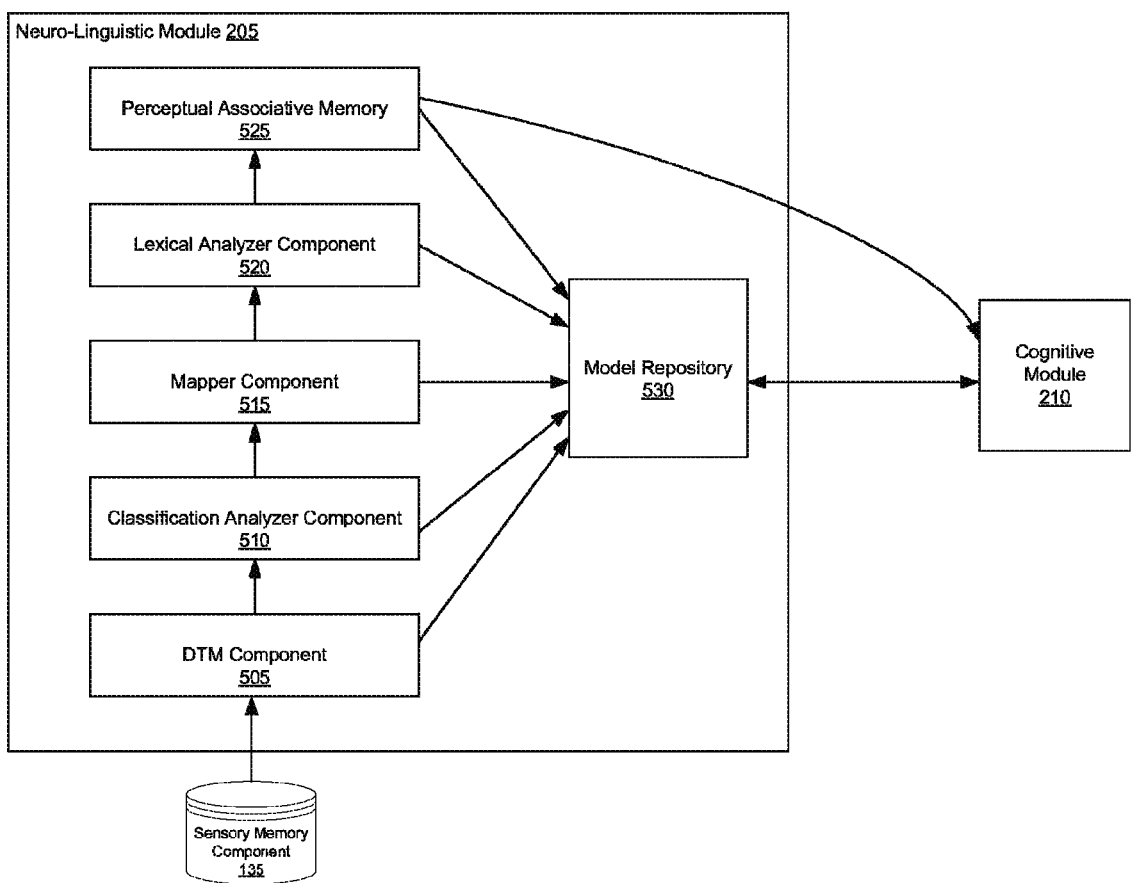
FIG. 5 illustrates a neuro-linguistic module of a behavioral recognition system, according to one embodiment.

FIG. 5 further illustrates a neuro-linguistic module 205 of the behavior recognition system 100, according to one embodiment. As shown, the neuro-linguistic module 205 includes a data transactional memory (DTM) component 505, a classification analyzer component 510, a mapper component 515, a lexical analyzer component 520, a perceptual associative memory (PAM) component 525, and a model repository 530.

The DTM component 505 retrieves the normalized data vectors from the sensory memory component 135 and stages the data in the pipeline architecture provided by the GPU 121.

The classification analyzer component 510 evaluates the normalized data organized by the DTM component 505 and maps the data on a neural network. In one embodiment, the neural network is a combination of a self-organizing map (SOM) and an adaptive resonance theory (ART) network. The neural network clusters the data by identifying features of the normalized vector data which occur repeatedly in association with each other.

The mapper component 515 identifies symbols (i.e., builds an alphabet of "letters") based on the clustered data. Specifically, the mapper component 515 determines a statistical distribution of the clustered data and assigns a symbol to data input belonging to a same cluster. A symbol is the building block of the linguistic model defined by the neuro-linguistic module 205. In one embodiment, a symbol provides a "fuzzy" (as used in the artificial intelligence field) representation of the data belonging to a given cluster. The symbol may be described as a letter of an alphabet.

Further, the mapper component 515 is adaptive. That is, the mapper component 515 may identify new symbols corresponding to new clusters generated from the normalized data, as such clusters are reinforced to a point where they become statistically relevant. The mapper component 515 learns on-line and may merge similar observations to a more generalized symbol. As stated, the mapper component 515 assigns a symbol to a generated cluster. Thereafter, as additional observations which map to that cluster are observed, mapper component outputs instances of the symbol assigned to that cluster. Once a given cluster matures, the mapper component 515 begins sending that symbol to the lexical analyzer component 520 in response to normalized data that matches the cluster. In one embodiment, the mapper component 515 limits the set of symbols that can be sent to the lexical analyzer component 520 to the most statistically relevant clusters. In practice, outputting symbols (i.e., letters) assigned to the top thirty-two clusters has shown to be effective. However, other amounts may also prove effective, such as the top sixty-four or 128 most frequently occurring symbols. Note, over time, the most frequently observed symbols may change as different clusters increase in statistical significance as well as when new clusters become statistically relevant.

In one embodiment, the mapper component 515 evaluates an unusualness score for identified symbols. The unusualness score is based on the frequency of a given symbol relative to other symbols that the mapper component 515 identifies. The unusualness score may increase or decrease over time as the neuro-linguistic module 205 receives more observed data.

The mapper component 515 sends a stream of the symbols (e.g., letters), timestamp data, unusualness scores, and statistical data (e.g., a representation of the cluster associated with a given symbol) to the lexical analyzer component 520. The lexical analyzer component 520 builds a dictionary based on symbols output from the mapper component 515. In practice, the mapper component 515 may need approximately 5,000 observations (i.e., normalized vectors of input data) to generate a stable alphabet of symbols.

The lexical analyzer component 520 builds a dictionary for the linguistic model by identifying combinations of symbols, e.g., words, from the symbols transmitted by the mapper component 515. The lexical analyzer component 520 identifies repeating patterns and sub-patterns of letters and calculates frequencies of the patterns occurring throughout the symbol stream. The combinations of symbols may represent a particular activity, event, etc (e.g. "Start", "Stop", "Turn", "Enter", "Exit", etc). Of course, to the system, the event is an arbitrary sequence of symbols (assigned to clusters) that has been observed to have statistical significance.

In one embodiment, the lexical analyzer component 520 limits the length of words in the dictionary to allow the lexical analyzer component 520 to identify a number of possible combinations without adversely affecting the performance of the behavior recognition system 100. Further, the lexical analyzer component 520 uses a sliding window based on the maximum length to identify words for the dictionary. For example, assume the maximum length of a word may be five symbols. In this case, the lexical analyzer component 520 may use a sliding window of ten symbols to identify words (and sub-words within the words) within the window. In practice, limiting a word to a maximum of five or six symbols has shown to be effective.

Like the mapper component 515, the lexical analyzer component 520 is adaptive. That is, the lexical analyzer component 520 may learn, decay, and generate words over time. Further, the lexical analyzer component 520 may determine an unusualness score for each word based on how frequently the word occurs in the data. For instance, a word X that appears rarely in the data may have a higher unusualness score than a word Y that appears commonly in the data. The unusualness score may increase or decrease over time as the neuro-linguistic module 205 receives more data.

In addition, as additional observations (i.e., symbols) are passed to the lexical analyzer component 520 and identified as a given word, the lexical analyzer component 520 may determine that the word has matured. Once a word has matured, the lexical analyzer component 520 may output observations of that word to the PAM component 525. In one embodiment, the lexical analyzer component 520 limits the words sent to the PAM component 525 to the most statistically relevant words. In practice, outputting occurrences of the top 1,000 most frequently occurring words has shown to be effective. Note, over time, the most frequently observed words may change as the observations of incoming letters change in frequency.

Once the lexical analyzer component 520 has built the dictionary (i.e., identifies words that have a dynamically determined statistical relevance), the lexical analyzer component 520 sends data that includes a stream of the symbols, words, timestamp data, unusualness scores, and statistical calculations to the PAM component 525. The PAM component 320 builds a syntax of phrases with a strong set of words output from the lexical analyzer component 319. In practice, lexical analyzer component 319 may obtain a dictionary of meaningful words after receiving approximately 15,000 observations (i.e., input symbols).

The PAM component 525 identifies a syntax of phrases based on the sequence of words output from the lexical analyzer component 319. Specifically, the PAM component 525 retrieves the words identified by the lexical analyzer component 520 and generates a connected graph, where the nodes of the graph represent the words, and the edges represent a relationship between the words. The PAM component 525 may reinforce or decay the links based on the frequency that the words output by the mapper component 515 are connected with one another in a data stream.

Similar to the mapper component 515 and the lexical analyzer component 520, the PAM component 525 determines an unusualness score for each identified syntax phrase based on how frequently the phrase occurs in the data. For instance, a phrase X that occurs rarely in the data may have high unusualness score, whereas a phrase Y that occurs commonly in the data may have a low unusualness score. The unusualness score may increase or decrease over time as the neuro-linguistic module 205 receives more data.

The PAM component 525 identifies syntax of phrases from the ordered observations of words output from the lexical analyzer component 520. As observations of words corresponding to a given phrase accumulate, the PAM component 525 may determine that the given phrase has matured, i.e., reached a measure of statistical relevance after many observations. The PAM component 525 may output observations of that phrase to the cognitive module 210. The PAM component 525 sends data that includes a stream of the symbols, words, phrases, timestamp data, unusualness scores, and statistical calculations to the semantic memory 710 of the cognitive module 210. In practice, the PAM component 525 may obtain a meaningful set of phrases after observing about 5000 words from the lexical analyzer component 520. The semantic memory 710 may reliably identify complex phrases from the phrases output by the PAM component 525.

The initial set of generated letters, words, and phrases forms a neuro-linguistic model of the input data stream that the behavior recognition system 100 uses to compare subsequent observations of letters, words, and phrases against the generated model. The neuro-linguistic module 205 updates the linguistic model as new data is received. Further, the neuro-linguistic module 205 may compare a currently observed syntax to the model. That is, after building a stable set of letters, the neuro-linguistic module 205 may build a stable model of words (e.g., a dictionary). In turn, the neuro-linguistic module 205 may be used to build a stable model of phrases (e.g., a syntax). Thereafter, when the neuro-linguistic module 205 receives subsequent normalized data, the module 205 can output an ordered stream of symbols, words, and phrases, all of which can be compared to the stable model to identify interesting patterns or detect deviations occurring in the stream.

Figure 6:
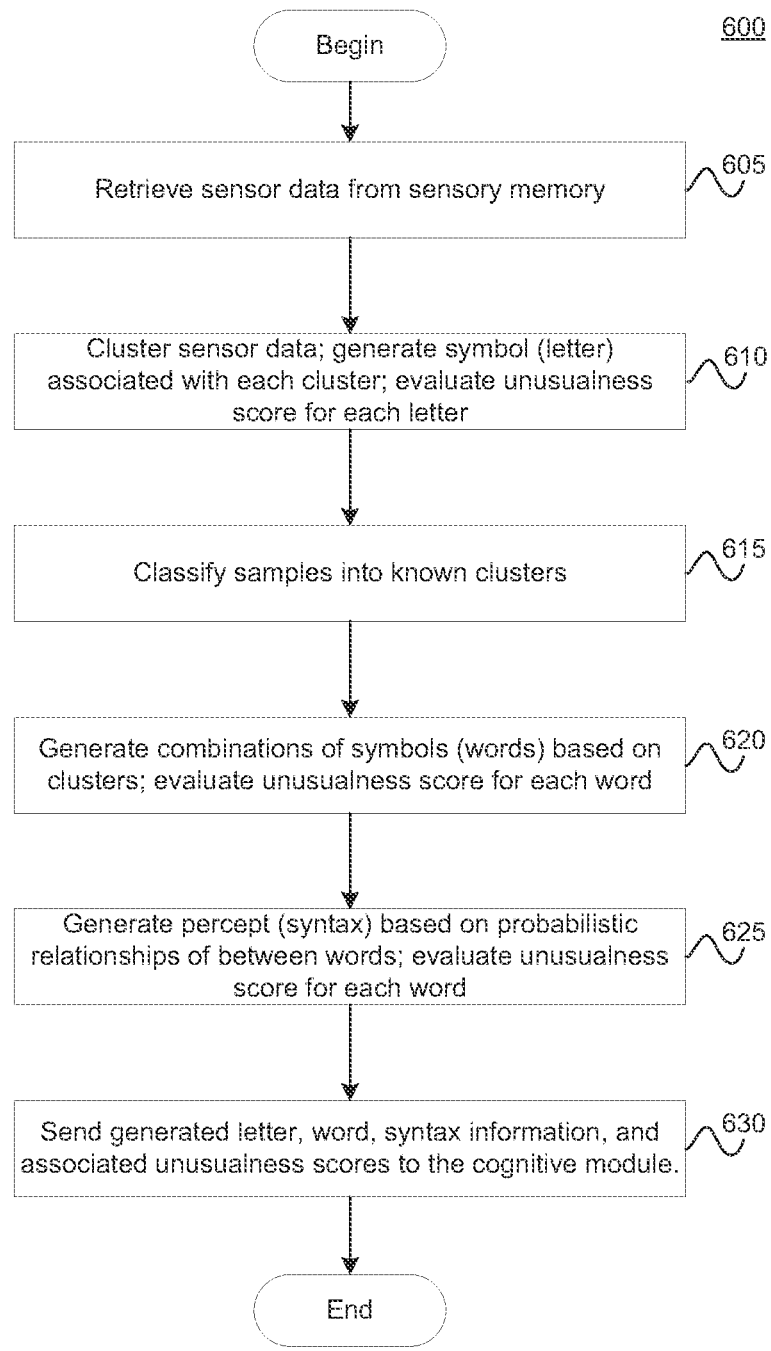
FIG. 6 illustrates a method for generating a linguistic model of normalized sensor data, according to one embodiment.

FIG. 6 illustrates a method 600 for generating a linguistic model of normalized sensor data, according to one embodiment. At step 605, the DTM component 505 receives the sensor data from sensory memory 135. As stated, the sensor data includes normalized values of data evaluated by a data collector module 305, such as a video driver 306.

At step 610, the classification analyzer component 510 clusters the normalized vectors based on values that occur repeatedly in association with one another. In addition, the mapper component 515 generates symbols to associate with each cluster. The mapper component 515 also evaluates the frequency that each symbol occurs in the data stream. Thereafter, the mapper component 515 determines a unusualness score for each symbol. The mapper component 515 continues to identify symbols and evaluate statistical frequencies of the identified symbols.

At step 615, the lexical analyzer component 520 generates combinations of symbols for a dictionary to be used in the linguistic module. To do so, the lexical analyzer component 520 identifies repeating patterns and sub-patterns of letters and calculates frequencies of the patterns occurring throughout the symbol stream. Further, the lexical analyzer component 520 determines an unusualness score for each word based on the calculated frequencies. The lexical analyzer component 520 continues to identify words and evaluate statistical frequencies of the identified words.

At step 620, the PAM component 525 generates a percept (syntax) of the identified words based on probabilistic relationships between the words. Further, the PAM component 525 calculates frequencies of phrases occurring in the data stream. The PAM component 525 calculates an unusualness score for each phrase based on the frequencies. The PAM component 525 continues to identify phrases and evaluate statistical frequencies of the identified phrases.

At step 625, the PAM component 525 sends the generated letter, word, and phrase data, along with the respective unusualness scores to the cognitive module 210.

Figure 7:
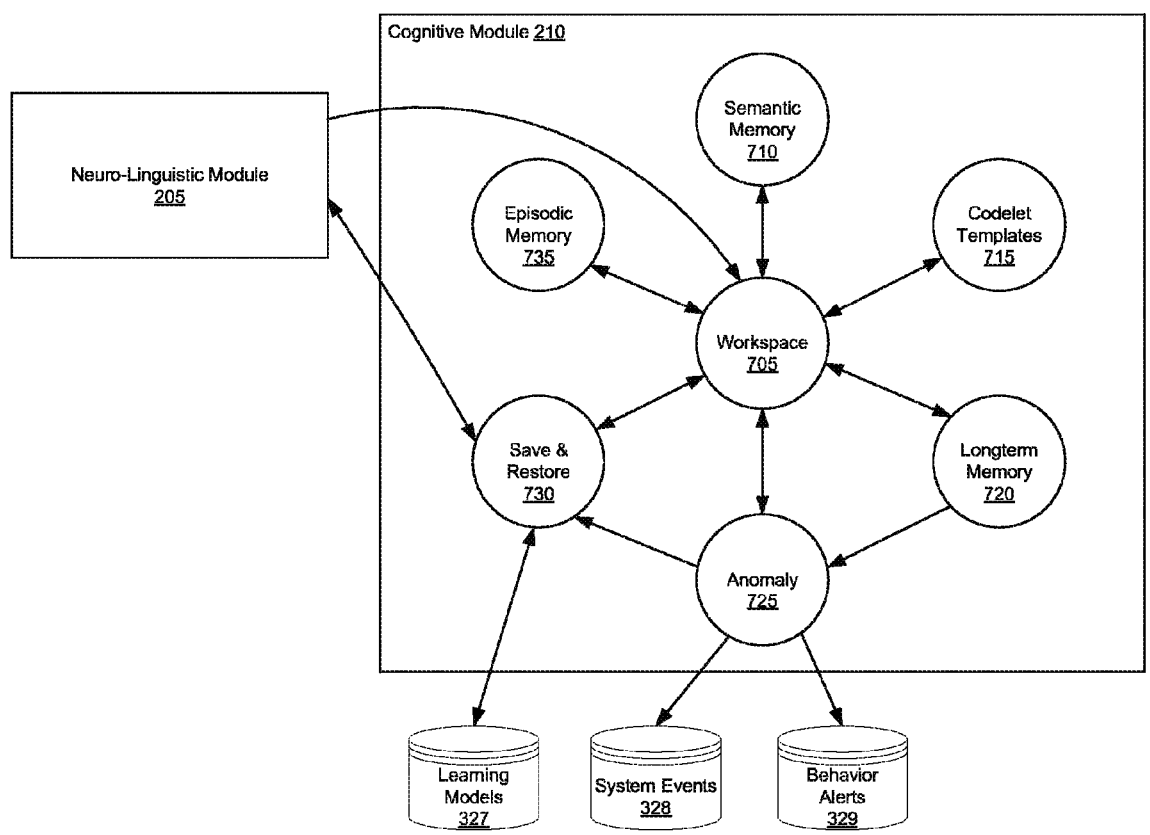
FIG. 7 illustrates a cognitive module of a behavioral recognition system, according to one embodiment.

FIG. 7 illustrates a cognitive module 210 of the behavior recognition system 100, according to one embodiment. As shown, the cognitive module 210 includes a workspace 705, a semantic memory 710, codelet templates 715, a long-term memory 720, an anomaly component 725, a save & restore component 730, and an episodic memory 735.

Generally, the workspace 705 provides a computational engine for the machine learning engine 140. For example, the workspace 705 may retrieve relevant memories from the episodic memory 735 and the longterm memory 720, select codelet templates 715 to execute, etc. Further, the workspace 705 receives the symbols, words, and syntax phrases (as well as unusualness scores) from the neuro-linguistic module 205 and stores these data in the semantic memory 710.

The workspace 705 retrieves the neurolinguistic data from semantic memory 710 and disseminates this data to different portions of the cognitive module 210 as needed.

The episodic memory 735 stores linguistic observations related to a particular episode in the immediate past and may encode specific details, such as the "what" and the "when" of a particular event.

In contrast, the long-term memory 720 may store generalizations of the observed data. Thus, the long-term memory 720 generalizations of the linguistic data with particular episodic details stripped away. In this way, when a new observation occurs, memories from the episodic memory 735 and the long-term memory 720 may be used to relate and understand a current event, i.e., the new event may be compared with past experience, leading to both reinforcement, decay, and adjustments to the information stored in the long-term memory 720, over time. In a particular embodiment, the long-term memory 720 may be implemented as an ART network and a sparse-distributed memory data structure. Importantly, however, this approach does not require the different events to be defined in advance.

The codelet templates 715 provide a collection of executable codelets, or small pieces of code that evaluate different sequences of events to determine how one sequence may follow (or otherwise relate to) another sequence. More generally, a codelet may detect interesting patterns from the linguistic analysis. By repeatedly scheduling codelets for execution, copying memories and percepts to/from the workspace 705, the cognitive module 210 performs a cognitive cycle used to observe, and learn, about patterns of behavior that occur within the scene.

The anomaly component 725 evaluates unusualness scores sent by the neuro-linguistic module 205 to determine whether to issue an alert in response to some abnormal activity indicated by the unusualness scores. Specifically, the anomaly component 725 is provides probabilistic histogram models (e.g., an unusual lexicon model, an unusual syntax model, and an unusual model) which represent the unusualness scores. The anomaly component 725 may store scores by encoding the scores into a compressed format. The anomaly component 725 may send alert data to the system events store 328 and the behavior alerts store 329. The save and restore component 730 is a data store that receives and maintains different states of the linguistic model from the model repository 530.

The cognitive module 210 performs learning analysis on the linguistic content delivered to semantic memory 710 (i.e., the identified symbols, words, phrases) by comparing new observations to the learned patterns kept in semantic memory 710 and then estimating the rareness of these new observations.

Specifically, the anomaly component 725 evaluates the unusualness scores of each of the symbols, words, and phrases to identify abnormal occurrences in the observed data. Once an anomalous observation has been identified, the anomaly component may issue an alert (e.g., notify an administrator or user of the behavior recognition system 100).

One embodiment of the present disclosure is implemented as a program product for use with a computer system. The program(s) of the program product defines functions of the embodiments (including the methods described herein) and can be contained on a variety of computer-readable storage media. Examples of computer-readable storage media include (i) non-writable storage media (e.g., read-only memory devices within a computer such as CD-ROM or DVD-ROM disks readable by an optical media drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present disclosure, are embodiments of the present disclosure. Other examples media include communications media through which information is conveyed to a computer, such as through a computer or telephone network, including wireless communications networks.

In general, the routines executed to implement the embodiments of the present disclosure may be part of an operating system or a specific application, component, program, module, object, or sequence of instructions. The computer program of the present disclosure is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the disclosure. However, it should be appreciated that any particular program nomenclature that follows is used merely for convenience, and thus the present disclosure should not be limited to use solely in any specific application identified and/or implied by such nomenclature.

As described, embodiments herein provide techniques for generating a linguistic model of input data via a behavior recognition system. Once generated, the behavior recognition system analyzing and learning behavior based on the linguistic model to distinguish between normal and abnormal activity in observed data. Advantageously, this approach does not relying on predefined patterns to identify behaviors and anomalies but instead learns patterns and behaviors by observing a scene and generating information on what it observes.

While the foregoing is directed to embodiments of the present disclosure, other and further embodiments of the disclosure may be devised without departing from the basic scope thereof, and the scope thereof is determined by the claims that follow.

What is claimed is:

1. A method for generating a neuro-linguistic model of input data obtained from one or more data sources, the method comprising:
generating, via a processor, a sequence of symbols based on an ordered stream of normalized vectors generated from the input data;
generating a dictionary of words from combinations of the ordered sequence of symbols based on a frequency at which combinations of symbols appear in the ordered sequence of symbols; and
generating a plurality of phrases based an ordered sequence of words from the dictionary observed in the ordered sequence of symbols based on a frequency by which combinations of words in ordered sequence of words appear relative to one another.

2. The method of claim 1, further comprising, determining, for at least one symbol, word, or phrase, an unusualness score based on a frequency of the at least one symbol, word, or phrase, as generated from the ordered stream of normalized vectors generated from the input data.

3. The method of claim 1, further comprising, identifying anomalous behavior present in subsequent symbols, words, and phrases generated from the ordered stream of normalized vectors generated from the input data, based on a comparison with the sequence of symbols, generated dictionary and generated plurality of words.

4. The method of claim 1, wherein words included in the dictionary include a set of words having a most statistical relevance relative to a complete set of words generated from combinations of the ordered sequence of symbols.

5. The method of claim 1, wherein each normalized vector represents an element of the input data in a range of 0 to 1, inclusive.

6. The method of claim 1, wherein one of the data sources is a sequence of video frames.

7. The method of claim 1, wherein generating the dictionary comprises building a dictionary of words up to a maximum length of symbols.

8. A non-transitory computer-readable storage medium storing instructions, which, when executed on a processor, performs an operation for generating a linguistic model of input data obtained from a data source, the operation comprising:
generating, via a processor, a sequence of symbols based on an ordered stream of normalized vectors generated from the input data;
generating a dictionary of words from combinations of the ordered sequence of symbols based on a frequency at which combinations of symbols appear in the ordered sequence of symbols; and
generating a plurality of phrases based an ordered sequence of words from the dictionary observed in the ordered sequence of symbols based on a frequency by which combinations of words in ordered sequence of words appear relative to one another.

9. The non-transitory computer-readable storage medium of claim 8, wherein the operation further comprises, determining, for at least one symbol, word, or phrase, an unusualness score based on a frequency of the at least one symbol, word, or phrase, as generated from the ordered stream of normalized vectors generated from the input data.

10. The non-transitory computer-readable storage medium of claim 8, wherein the operation further comprises, identifying anomalous behavior present in subsequent symbols, words, and phrases generated from the ordered stream of normalized vectors generated from the input data, based on a comparison with the sequence of symbols, generated dictionary and generated plurality of words.

11. The non-transitory computer-readable storage medium of claim 8, wherein the operation further comprises, wherein words included in the dictionary include a set of words having a most statistical relevance relative to a complete set of words generated from combinations of the ordered sequence of symbols.

12. The non-transitory computer-readable storage medium of claim 8, wherein each normalized vector represents an element of the input data in a range of 0 to 1, inclusive.

13. The non-transitory computer-readable storage medium of claim 8, wherein one of the data sources is a sequence of video frames.

14. The non-transitory computer-readable storage medium of claim 8, wherein generating the dictionary comprises building a dictionary of words up to a maximum length of symbols.

15. A system, comprising:
a processor; and
a memory storing one or more application programs configured to perform an operation for generating a linguistic model of input data obtained from a data source, the operation comprising:
generating a sequence of symbols based on an ordered stream of normalized vectors generated from the input data,
generating a dictionary of words from combinations of the ordered sequence of symbols based on a frequency at which combinations of symbols appear in the ordered sequence of symbols, and
generating a plurality of phrases based an ordered sequence of words from the dictionary observed in the ordered sequence of symbols based on a frequency by which combinations of words in ordered sequence of words appear relative to one another.

16. The system of claim 15, wherein the operation further comprises, determining, for at least one symbol, word, or phrase, an unusualness score based on a frequency of the at least one symbol, word, or phrase, as generated from the ordered stream of normalized vectors generated from the input data.

17. The system of claim 15, wherein the operation further comprises, identifying anomalous behavior present in subsequent symbols, words, and phrases generated from the ordered stream of normalized vectors generated from the input data, based on a comparison with the sequence of symbols, generated dictionary and generated plurality of words.

18. The system of claim 15, wherein the operation further comprises, wherein words included in the dictionary include a set of words having a most statistical relevance relative to a complete set of words generated from combinations of the ordered sequence of symbols.

19. The system of claim 15, wherein each normalized vector represents an element of the input data in a range of 0 to 1, inclusive.

20. The system of claim 15, wherein one of the data sources is a sequence of video frames.

21. The system of claim 15, wherein generating the dictionary comprises building a dictionary of words up to a maximum length of symbols.

* * * * *